INVENTOR.
JOHN R. CALDWELL

BY

ATTORNEY

May 7, 1968     J. R. CALDWELL     3,381,573

SCANNING ATTACHMENT

Filed June 18, 1965     4 Sheets-Sheet 2

INVENTOR.
JOHN R. CALDWELL

BY

ATTORNEY

May 7, 1968 J. R. CALDWELL 3,381,573
SCANNING ATTACHMENT
Filed June 18, 1965 4 Sheets-Sheet 4

INVENTOR.
JOHN R. CALDWELL
BY
ATTORNEY

United States Patent Office 3,381,573
Patented May 7, 1968

3,381,573
SCANNING ATTACHMENT
John R. Caldwell, Rochester, N.Y., assignor to Xerox Corporation, Rochester, N.Y., a corporation of New York
Filed June 18, 1965, Ser. No. 465,104
4 Claims. (Cl. 88—24)

ABSTRACT OF THE DISCLOSURE

A device for presenting both sides of a card to a platen which will project the images of both sides of the card to an exposure station.

This invention relates to a duplex scanning attachment for an electrostatographic reproducing machine and in particular to a device which will allow the copying of two-sided cards during a single scan of a xerographic machine.

In Mayo et al. Patent 3,062,109 issued Nov. 6, 1962 there is shown a xerographic reproducing machine wherein a xerographic plate comprising a layer of photoconductive insulating material on a conductive backing is given a uniform electric charge over its surface and then exposed to the subject matter to be reproduced usually by conventional projection techniques. This exposure discharges the plate areas in accordance with the radiation intensity which reaches them and thereby creates an electrostatic latent image on or in the plate coating. When the subject matter to be reproduced is a small card or sheet heretofore it has been necessary to scan the document twice, once for each side for exposure to the xerographic plate.

It is an object of this invention to improve reproduction techniques whereby both sides of a small card may be reproduced during one scan of the xerographic projection system.

Another object of this invention is to improve the scanning operation of a xerographic reproducing machine.

A further object of this invention is to improve the efficiency of a xerographic reproducing machine.

These and other objects of the invention are attained by a duplex scanning attachment for use with a reproducing apparatus which exposes both sides of a card to the projection or scanning system of the reproducing apparatus.

For a better understanding of the invention as well as further objects and features thereof, reference is had to the following detailed description of the invention to be read in connection with the accompanying drawings, wherein.

Figure 1:
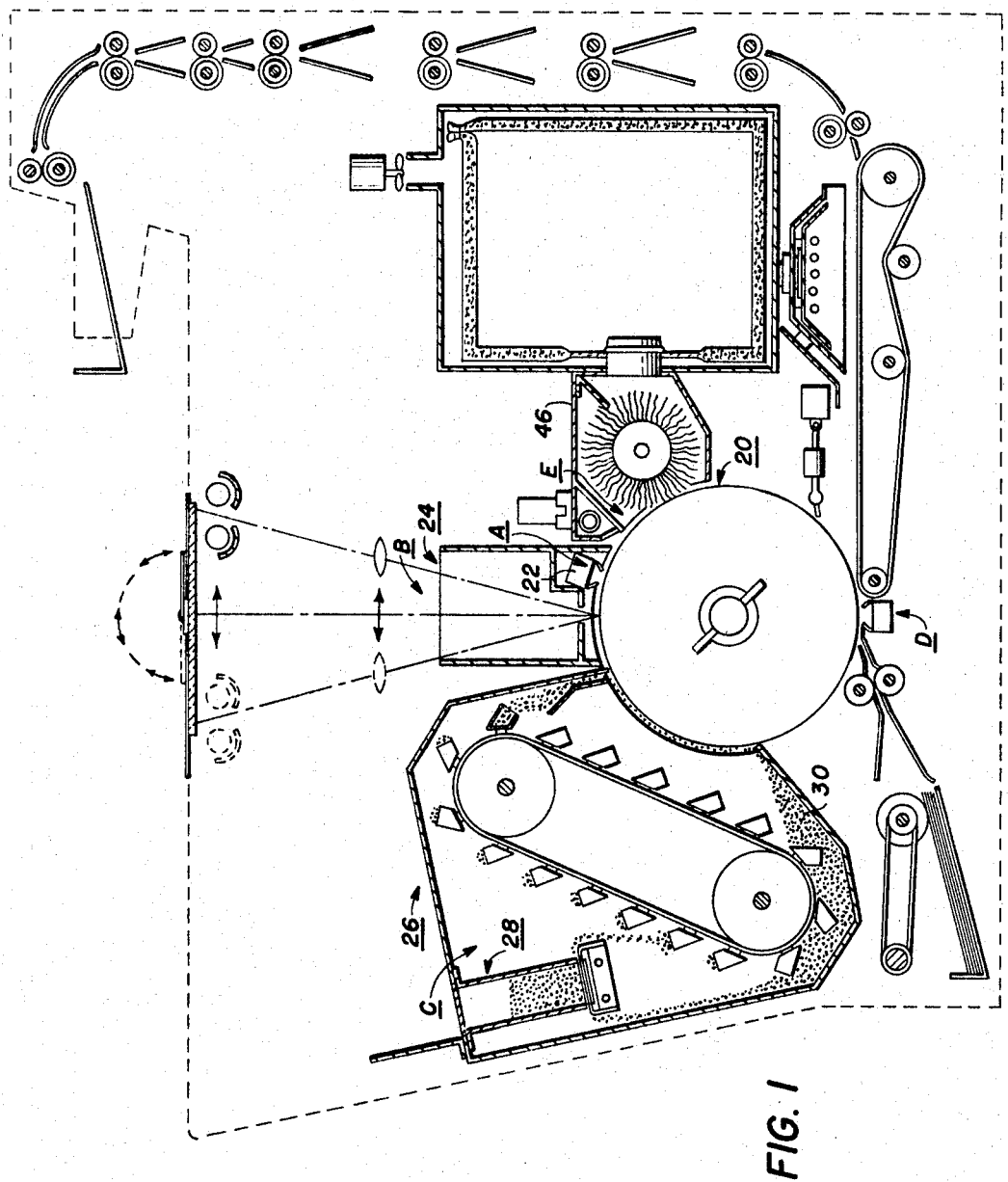
FIG. 1 is a schematic view of a preferred embodiment of the xerographic apparatus used with the present invention.
Figure 2:
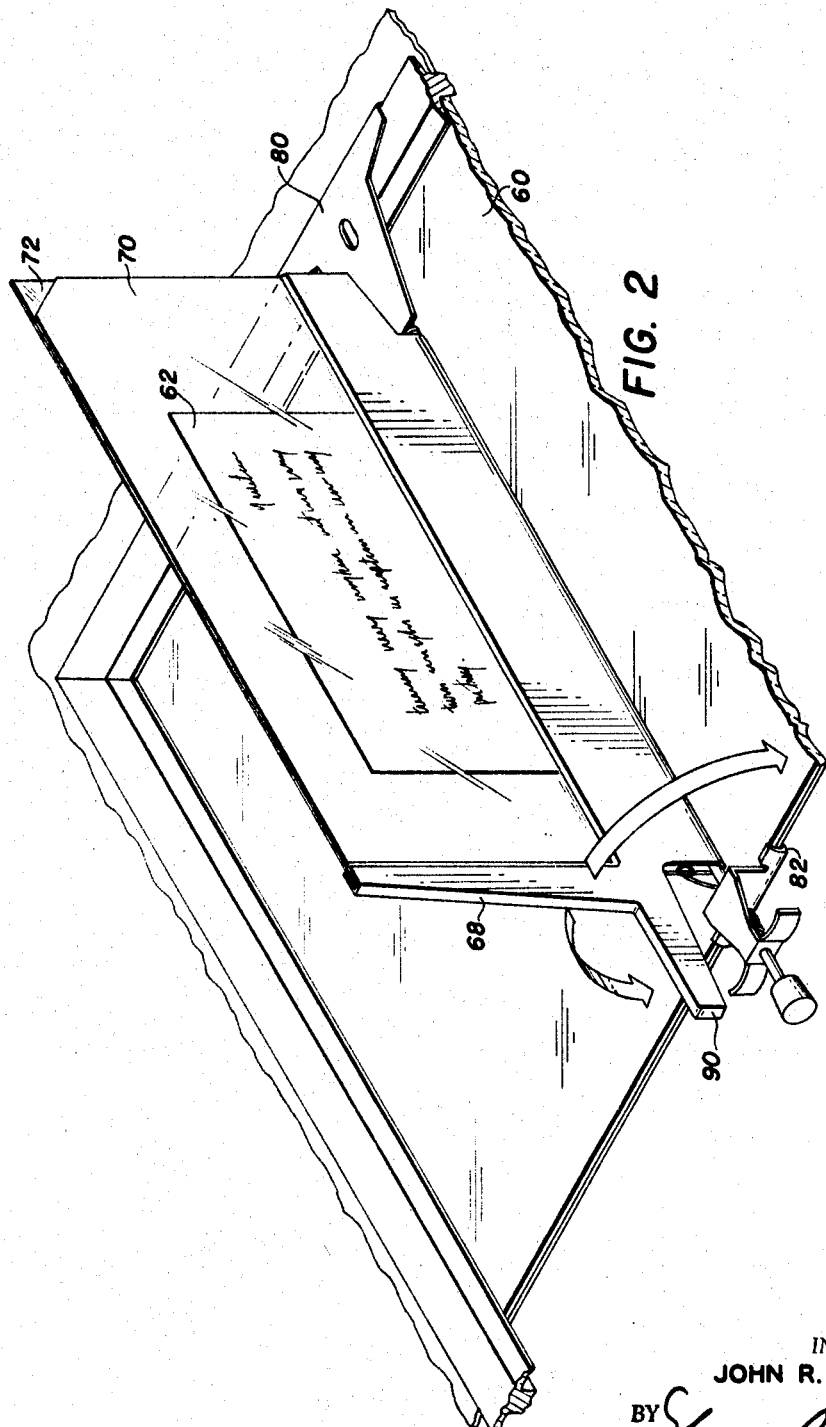
FIG. 2 is a right hand perspective of the scanning attachment constructed in accordance with the present invention shown with the frame in an upright position for clarity.

As shown in FIGURE 1, the xerographic apparatus comprises a xerographic plate including a photoconductive layer or light receiving surface on a conductive backing and formed in the shape of a drum 20 which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally as follows:

A charging station at which a uniform electrostatic charge is deposited on the photoconductive layer of the xerographic drum is shown at A. An exposure station at which a light to be reproduced is projected onto the drum surface to dissipate the drum charge on the exposed areas thereof, and thereby form a latent electrostatic image on the copy to be reproduced is shown at B. A developing station, where a xerographic drum is developed is shown at C. A transfer station at which the xerographic powder image is electrostatically transferred from the drum surface to the material is shown at D. A drum cleaning station is shown at E.

The charging apparatus or corona charging device 22 includes a corona discharge array of one or more discharge electrodes that extend transversely across the drum surface and are energized from a high potential source and are substantially enclosed within a shielding member.

The optical scanning or projection assembly generally designated 24, comprises a copyboard or platen 60 which may consist of a transparent plate member which is adapted to receive an original. The copyboard is uniformly illuminated and arranged in light-projecting relation to the moving light receiving surface of the xerographic drum.

Adjacent to the exposure station is a developing station C in which there is positioned a developer apparatus 26 including a developer housing having a lower or sump portion for accumulating developer material 30. Mounted within the developer housing is a motor driven bucket-type conveyor used to carry the developer material previously supplied to the developer housing to the upper portion of the developer housing from where the developer material is cascaded over a hopper chute onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the developer housing. Toner particles consumed during the developing operation to form the xerographic powder images are replenished by a toner dispenser 28 mounted within the developer housing.

Positioned next adjacent to the developing station is the image transfer station D which includes suitable sheet feeding mechanism adapted to feed sheets of paper successively to the xerographic drum in coordination with the presentation of the developed image on the drum at the transfer station.

The next and final station in the device is a drum cleaning station E whereat any powder remaining on the xerographic drum after the transfer step is removed and whereat the xerographic drum is flooded with light to cause dissipation of any residual electrical charge remaining on the xerographic drum.

Removal of residual powder from the xerographic drum is effected by means of a brush cleaning device 46 adapted to continuously clean the xerographic drum.

It is believed that the foregoing description is sufficient for the purposes of this application to show the general operation of the xerographic reproducing apparatus. For further details concerning the specific construction of the xerographic apparatus shown reference is made to the above mentioned Patent No. 3,062,109, issued Nov. 6, 1962 to Mayo et al.

In order to expose both sides of a card 62, the card 62 is inserted in frame 68 between two pieces of flexible transparent material 70 and 72 which are positioned in slots 74 of the frame 68.

The frame 68 is pivotally mounted on a shaft 76. Mounted on either end of the shaft 76 are a pair of clamps 80 and 82. The clamp 80 is rigidly secured to the shaft 76 while the clamp 82 is slidably adjustable thereon.

When the scanning attachment is mounted on the platen the clamp 80 is first mounted on one side of the platen while the clamp 82 is adjusted and then mounted on the other side of the platen. After the clamp 82 is in place on the opposite side of the platen, a spring 84 will force the clamp 82 securely aaginst the platen. The clamp 82 is movable by means of finger grips 86 onto which a middle and forefinger can be placed while the thumb of the hand rests on the end of the shaft 76 which has mounted thereon a knob or thumb rest 88.

Figure 4:
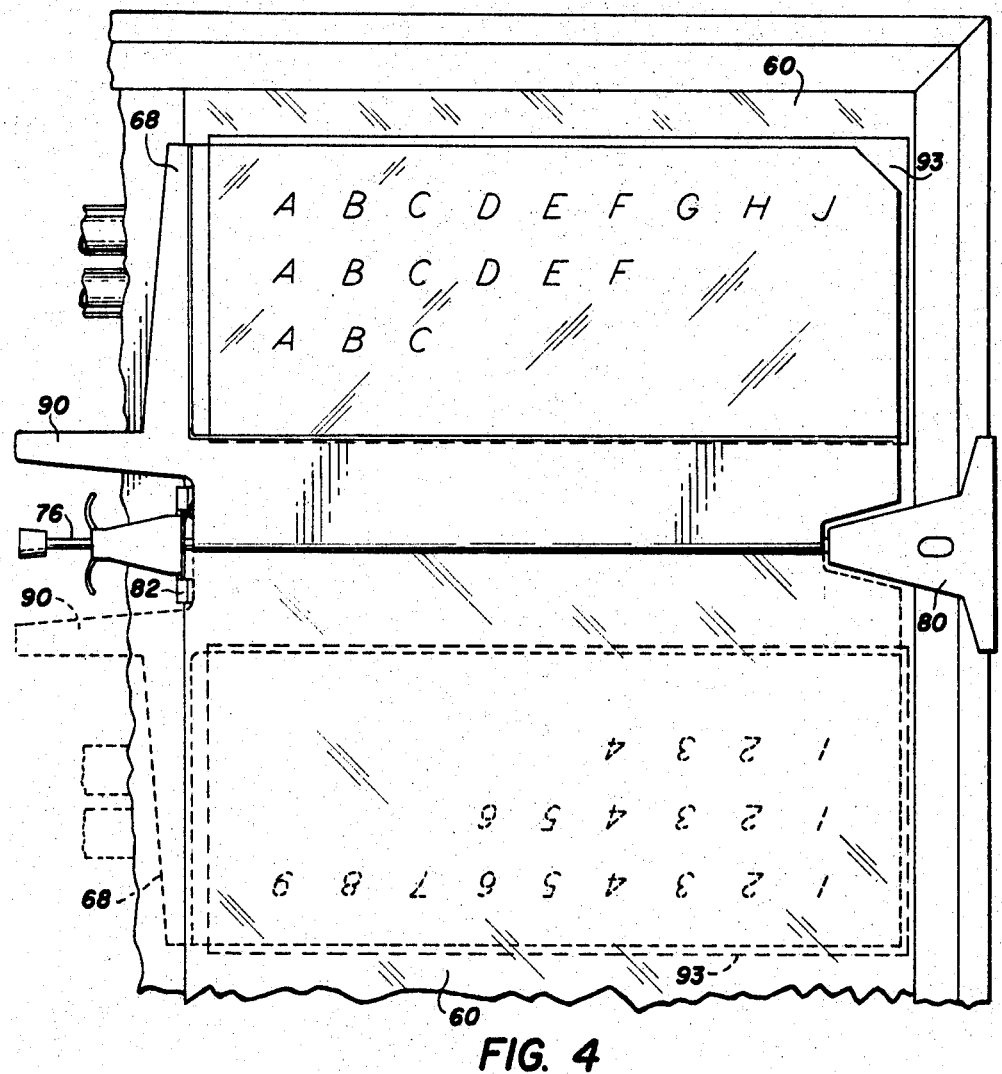
FIG. 4 is a top view of the scanning attachment attached to a platen of a copying machine and in dotted lines showing the attachment exposing the reverse side of a card to the exposure station of a copying machine.

The frame 68 holding the card is moved by means of handle 90 attached to the frame. As the scanning projector scans the card as shown in FIGURES 1 and 4, the scanning attachment is actuated by means of handle 90 and flipped to the reverse side as the scanner passes the shaft 76. The scanning attachment will expose the opposite side of the card to the scanner as shown in dotted lines in FIG. 4 thereby copying both sides of the card during one scan of the projector.

The scanning attachment is held in this position until the projector completes its scan at which time the scanning attachment is returned to the original position. The spring 92 keeps the frame 68 aligned against clamp 80 so there is no movement of the frame relative to the clamp during the scanning or operation of the scanning attachment.

Figure 3:
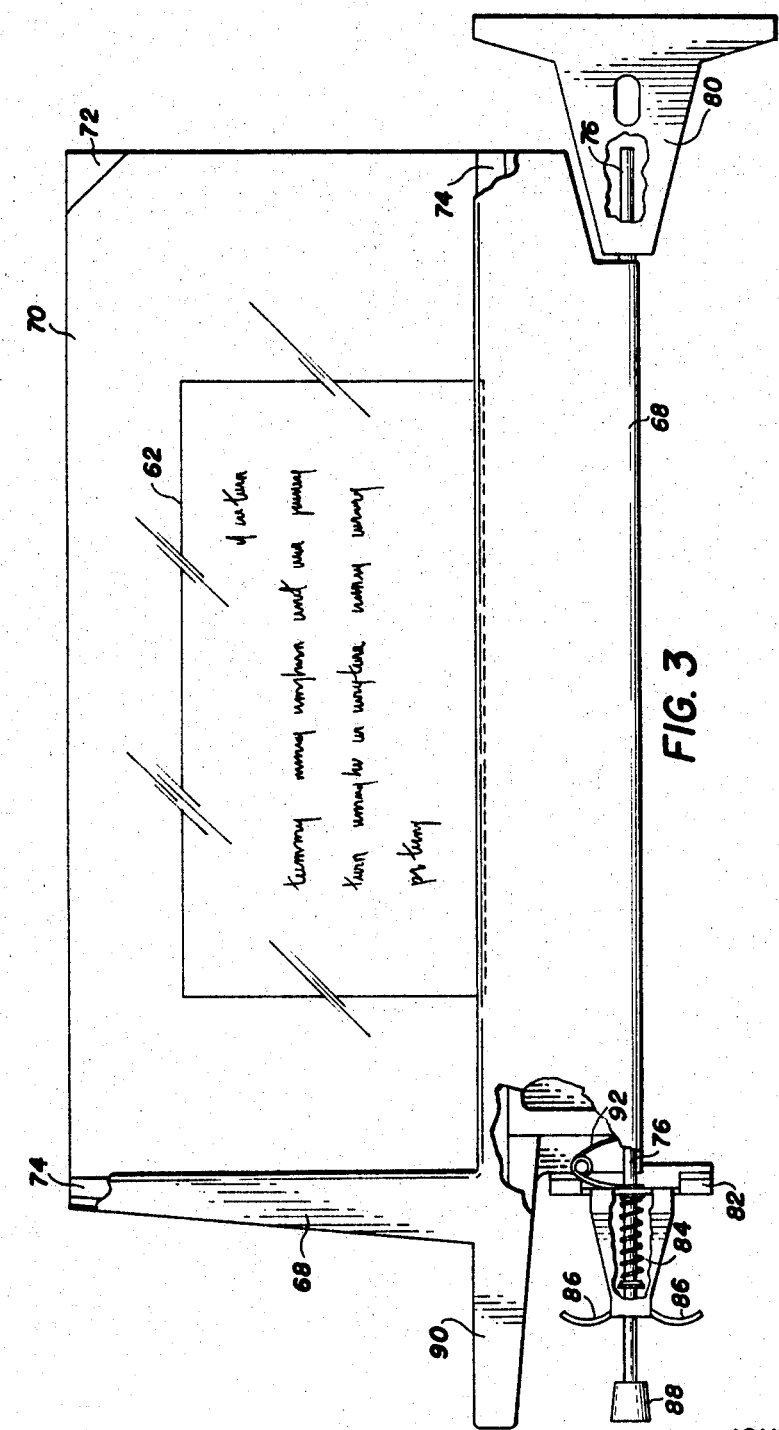
FIG. 3 is a top view of the scanning attachment with parts broken away.

The card 62 may be smaller than the frame 68 as shown in FIG. 3 or it may be larger as shown by the card 93 in in FIG. 4. The card could also be in the form of a small sheet of paper or other material. The card may be held in the slots 74 of the frame or merely held between the sheets of the flexible transparent material.

It is therefore seen that this is an easy and economical way to copy both sides of a card during one scan of the xerographic projection apparatus.

It will be understood that various changes in details, materials, steps and arrangements of parts, which have been herein described and illustrated in order to explain the nature of the invention, may be made by those skilled in the art within the principle and scope of the invention as expressed in the appended claims. However, while the invention has been described with reference to the structure disclosed herein, it is not to be confined to the details set forth, and this application is intended to cover such modifications or changes as may come within the scope of the following claims.

What is claimed is:

1. A device for presenting both sides of a card to a platen which will project the image of both sides of the card to an exposure station of a copying apparatus including:
   a frame
   means to attach the frame to a platen of the copying apparatus
   means on said frame for holding a card
   said attaching means including pivotal means mounted along the base of the frame to move the frame to expose both sides of the card to separate portions of the exposure station of the copying apparatus.

2. A device for presenting both sides of a card to a platen which will project the image of both sides of the card to an exposure station of a xerographic copying apparatus including
   a shaft
   a pair of clamps mounted on either end of the shaft to clamp the shaft to the platen
   a spring mounted on the shaft to tension the clamps against the platen
   a frame pivotally mounted on the shart
   said frame having two sheets of transparent material mounted therein
   said frame having a slot therein, for holding a card and said frame movable to expose both sides of the card to the platen
   a handle mounted on said frame for pivoting the frame about the shaft
   and a second spring mounted on the shaft to maintain the frame in alignment with the clamp.

3. A device for presenting both sides of a card to a platen which will project the image of both sides of the card to an exposure station of a copying apparatus including
   a shaft
   a pair of clamps mounted on either end of the shaft to clamp the shaft to the platen one of said clamps being rigidly secured to the shaft and the other clamp being slidably movable on said shaft
   a spring mounted on the shaft to tension the movable clamp against the platen
   a frame pivotably mounted on the shaft
   said frame having a slot therein
   said frame having two sheets of transparent material mounted in the slot of the frame for holding a card, said frame being movable to expose both sides of the card to the platen and
   means for pivoting said frame about the shaft.

4. In a xerographic reproducing apparatus having a scanning system for projecting the images on both sides of a card from a platen onto a xerographic drum, a scanning attachment including
   a shaft
   a pair of clamps mounted on either end of the shaft to clamp the shaft to the platen
   a spring mounted on the shaft to tension the clamps against the platen
   a frame pivotally mounted on the shaft
   said frame having two sheets of transparent material mounted therein
   said frame having a slot therein, for holding a card and said frame movable to expose both sides of the card to the platen
   a handle mounted on said frame for pivoting the frame about the shaft
   and a second spring mounted on the shaft to maintain the frame in alignment with the clamp.

References Cited

UNITED STATES PATENTS 1,692,544  11/1928  Caps et al. _____ 88—24

NORTON ANSHER, *Primary Examiner.*

R. A. WINTERCORN, *Assistant Examiner.*